Oct. 11, 1932.  G. W. HANSON  1,881,532
LUBRICATING SYSTEM
Filed Oct. 9, 1926  4 Sheets-Sheet 1
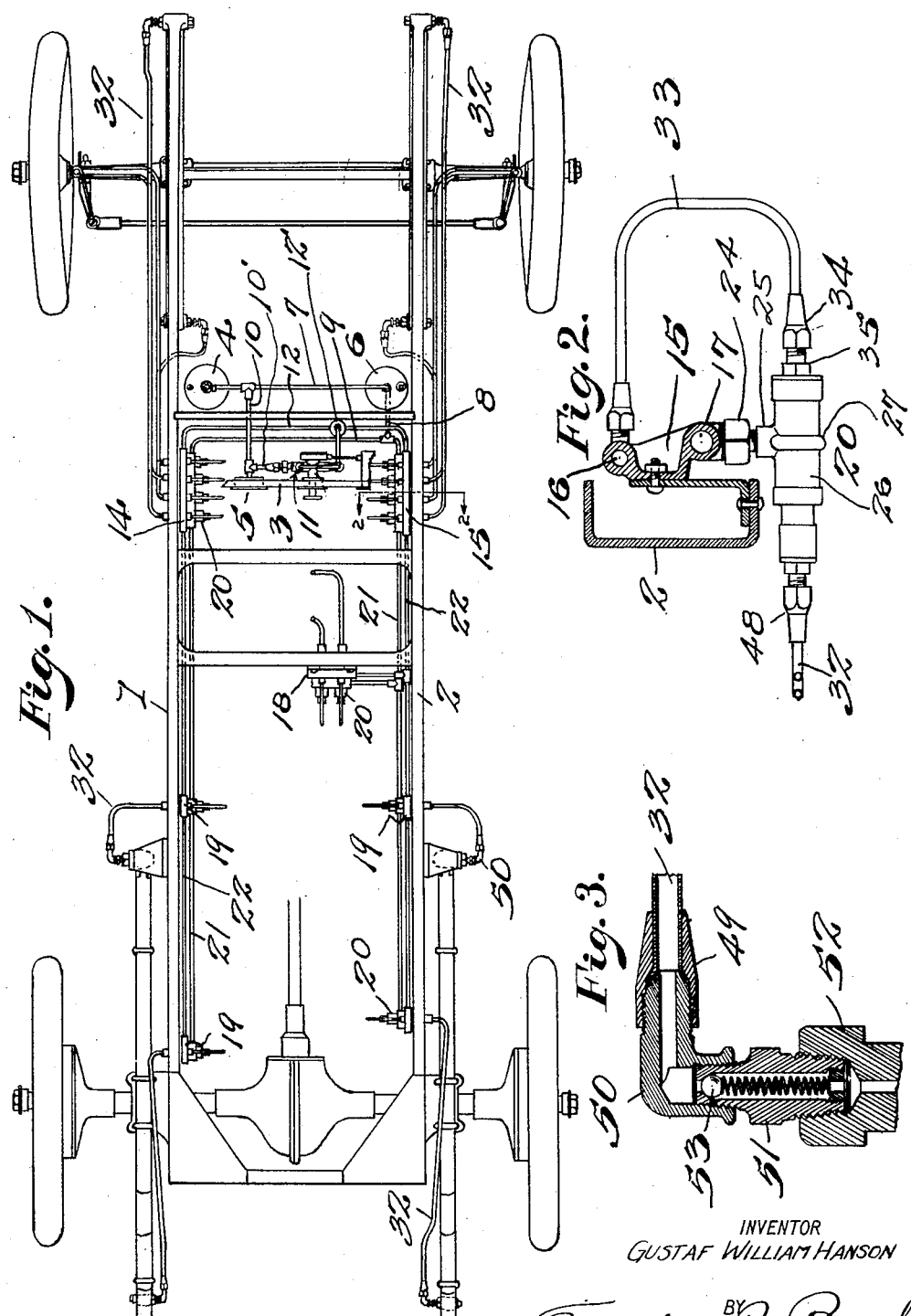
INVENTOR
GUSTAF WILLIAM HANSON
BY Fenelon B. Brock
ATTORNEY

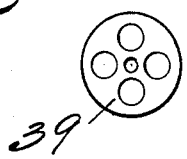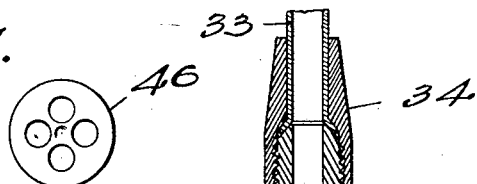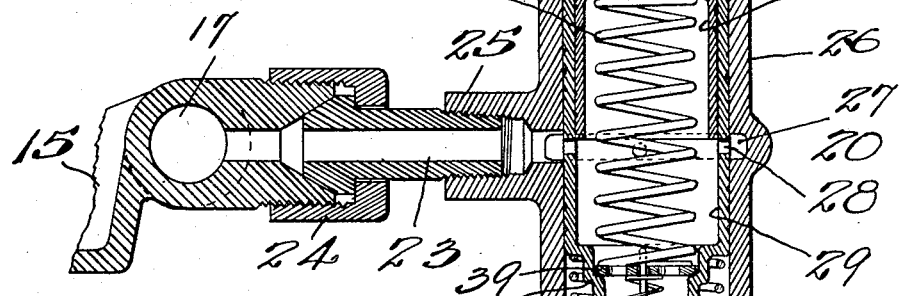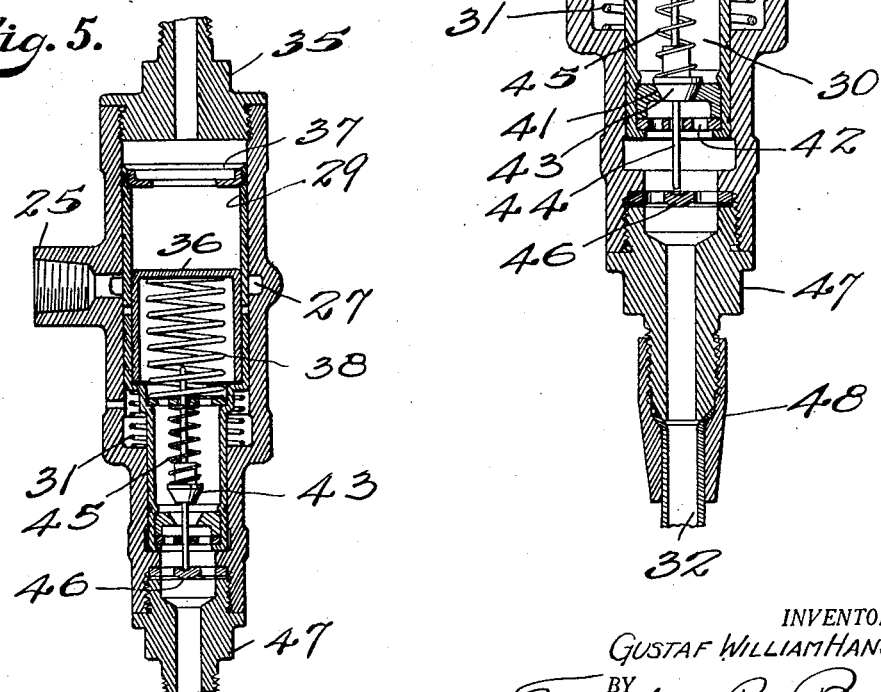

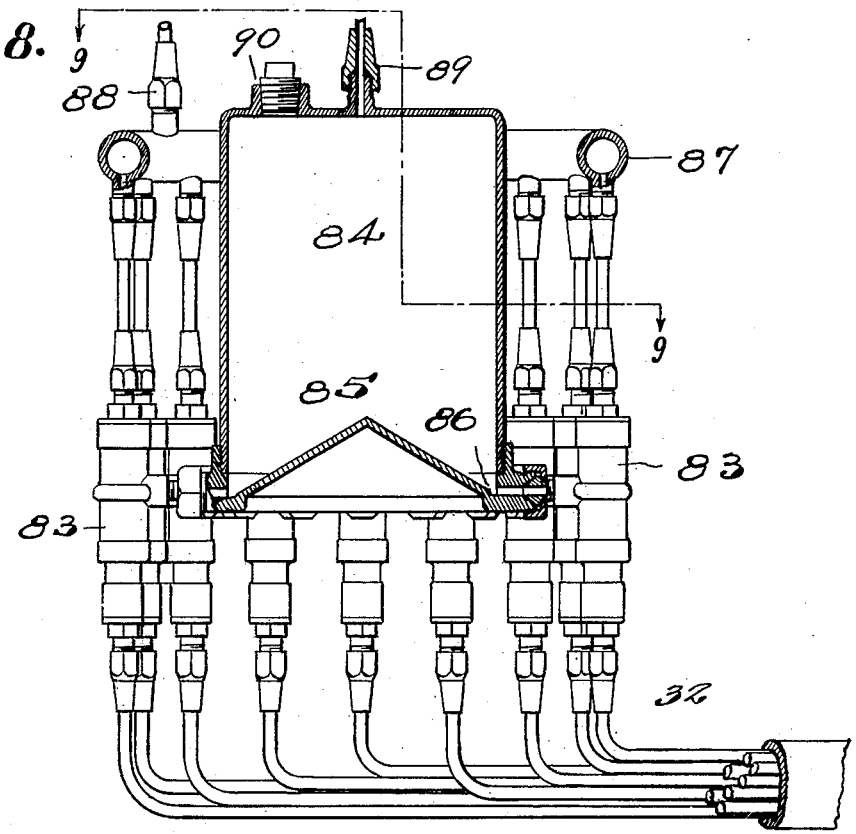
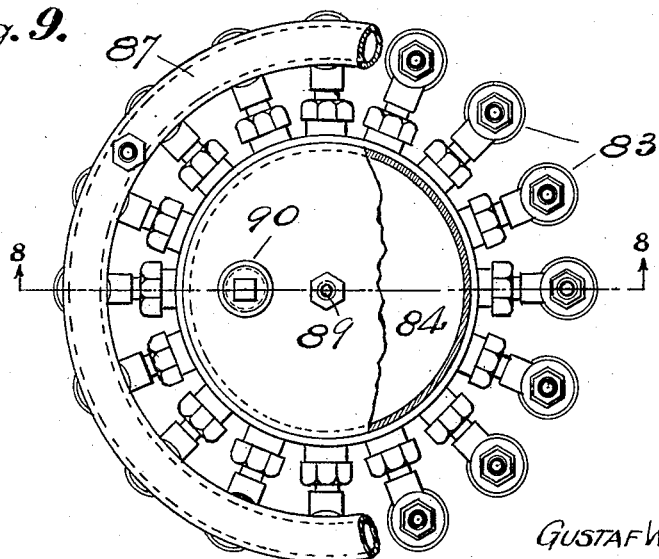

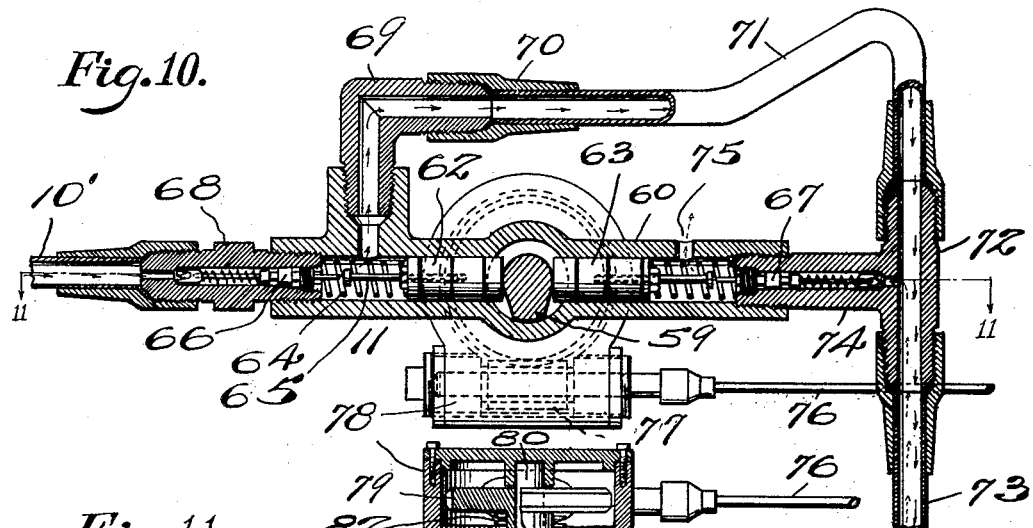

Patented Oct. 11, 1932

1,881,532

UNITED STATES PATENT OFFICE

GUSTAF W. HANSON, OF WICHITA, KANSAS

LUBRICATING SYSTEM

Application filed October 9, 1926. Serial No. 140,505.

My present invention relates to an improved lubricating system which while especially adapted for use in lubricating parts of the chassis of an automotive vehicle and herein illustrated for that purpose, is also applicable for use in lubricating parts of stationary power plants, etc. The lubricating system involves the use of a grease tank from which the grease is distributed under air pressure to a plurality of pneumatically operated grease pumps, and by means of the several pumps a predetermined quantity or charge of grease is injected to each of the several bearings.

A control valve is provided for the pneumatic pressure utilized in the lubricating system and this valve may either be manually operated at desired times, or it may be automatically and mechanically operated at predetermined times. When the system is used for lubricating bearings of a stationary power plant or machine, a time controlled mechanism may be employed to automatically actuate the control valve at predetermined intervals of time for lubricating parts of the plant or machine. When used on an automotive vehicle the control valve may be operated from a suitable accessory of the vehicle, as for instance, a speedometer, by means of which the valve may be actuated once for every fifty miles of travel to lubricate the bearings and other parts of the vehicle. The invention consists in certain novel combinations and arrangements of parts involved in the lubricating system as will be hereinafter more fully described and claimed.

In the accompanying drawings, I have illustrated one complete example of the physical embodiment of my invention adapted to lubricate parts of the chassis of an automotive vehicle, in which the parts are combined and arranged according to the best mode I have so far devised for the practical application of the principles of my invention. Changes and alterations within the scope of my claims may be made in the exemplified structure, as for instance, a modified arrangement of the grease pumps with relation to the grease tank as shown in Figs. 8 and 9, may be made. These and other changes and alterations are contemplated without departing from the principles of my invention.

Figure 1 is a plan view showing an automotive vehicle chassis equipped with a lubricating system of my invention;

Fig. 2 is an enlarged detail sectional view at line 2—2 of Fig. 1 showing one of the grease pumps and flexible connections;

Fig. 3 is an enlarged detail sectional view of one of the grease pipe joints and showing also a check valve located near a bearing to be lubricated;

Fig. 4 is an enlarged sectional view of one of the grease pumps containing a charge of grease with the parts in neutral position and not under air pressure;

Fig. 5 is a detail sectional view of a portion of the pump of Fig. 4 with the pump parts in discharging position for injecting the charge to a bearing;

Figs. 6 and 7 are plan views of perforated partitions or discs used in the pumps;

Fig. 8 is a view showing a modified arrangement of the distribution of grease, with the grease pumps clustered around and directly connected with a grease tank, the parts being shown in section as at line 8—8 of Fig. 9;

Fig. 9 is a partial top plan and partial section at line 9—9 of Fig. 8, showing the grease tank and pumps;

Fig. 10 is a vertical sectional view at line 10—10 of Fig. 11 showing the manually controlled valve for the air pressure, together with a mechanically or power actuated device for alternate use;

Fig. 11 is a horizontal sectional view at line 11—11 of Fig. 10 showing also the instrument board of an automobile; and Fig. 12 is a face view of the manually operated knob, indicator, and dial for the control valve.

In order that the general assembly and relation of parts may readily be understood, I have shown in Fig. 1 a conventional form of automobile chassis including the side bars 1 and 2, and the instrument board indicated as 3. In front of the instrument board at one side of the chassis is located an air reservoir 4 which is properly supported and adapted to receive compressed air. This air reservoir may be filled at a gasoline station or garage in manner similar to filling the tires of the vehicle, and an air gauge 5 is shown on the instrument board to indicate the pressure within this reservoir. At the opposite side of the chassis, a grease or lubricating tank 6 is supported and provided with usual inlet opening for filling with a suitable lubricant or grease. The grease in the grease tank 6 is placed under air pressure by means of an air pipe 7 extending from the air reservoir 4 into the top of the grease tank. The grease is discharged from the bottom of the grease tank through the main grease pipe 8 and branch 9.

The air pressure from the reservoir 4 passes through pipe 10 and then through the control valve mechanism indicated as a whole by the numeral 11 in Fig. 1, to an air pipe 12 which extends transversely of the chassis and is connected to a pair of distributing brackets 14 and 15 fixed at opposite sides of the chassis as indicated in Fig. 2. The air line is connected to a conduit 16 and the grease line 9 is connected to a conduit 17, these conduits being formed within the brackets and extending longitudinally of the chassis, as shown in Fig. 1. In addition to these distributing brackets 14 and 15, I use brackets as 18 and 19 constructed in manner similar to the brackets 14 and 15, but of smaller size and capacity than these brackets.

Each one of the distributing brackets is provided with one or more grease pumps indicated as a whole by the numeral 20, and grease pipes 21 and air pipes 22 extend from one distributing bracket to another to provide the necessary lubricant and air pressure for operating the various pumps 20 provided for the bearings located at various places about the automobile chassis, as indicated in Fig. 1.

As best seen in Fig. 4, the pumps are supplied with grease from the conduit 17 through a nozzle 23 which is coupled to the bracket by means of the nut 24, and threaded to the boss 25 of the cylinder 26 of the pump. The cylinder is provided with an interior annular groove 27 for the grease passing through the nipple 23, and the grease passes through ports 28 in the tubular valve 29 within the cylinder. This tubular valve is adapted to slide in the cylinder 26 and control the admission of grease through its ports 28 from the annular groove 27. The tubular valve is fashioned with a reduced extension 30, and a spring 31 normally holds it to its seat in neutral position as shown in Fig. 4. In this figure, the interior of the valve is assumed to be filled with grease caused to flow thereto by air pressure from the grease tank 6.

This charge of grease in the tubular valve is ejected therefrom to a lubricating pipe as 32 by means of air pressure from the air conduit 16 of the distributing bracket flowing through the air pipe 33. This pipe 33 in each instance, as shown in Fig. 1, extends from the air conduit of a distributing bracket to a pump as 20, and the pipe 33 is connected by a coupling sleeve 34 to the head 35 of the pump. Within the tubular valve 29 is arranged a piston 36, and the piston is adapted to move or slide with the tubular valve and also to move relatively thereto. An abutment 37 having a central opening is arranged in the open end of the tubular valve, and the piston 36 as seen in Fig. 4, closes this opening in the abutment. The air pressure flowing through air pipe 33 and the cylinder head 35 impinges against the abutment 37 of the tubular valve and the piston 36. This pressure moves the tubular valve against its spring 31 to close the ports 28 in the valve thus cutting off entrance of grease to the pump. The air pressure also moves the piston 36 which performs the function of an injector to force the charge of grease into pipe 32. The piston is moved against the tension of its spring 38 which spring bears against the perforated disc 39, which disc is supported upon a shoulder 40 in the extension 30 of the valve.

The extension 30 is fashioned with a valve seat 41 and washer 42 to accommodate the discharge grease valve 43 which is carried by the extension 30. This valve has a stem 44 and a spring 45 interposed between the valve 43 and the partition 39, and the free end of the stem 44 is adapted to engage the partition 46. This partition is in the form of a perforated washer which is secured in the open end of the cylinder by means of the small cylinder head 47, and the grease pipe 32 is connected to this head by means of a coupling 48. It will be seen in Figs. 4 and 5 that the discharge valve 43 is normally closed, and that it is removed from its seat when air pressure is applied to the abutment 37 and injector piston 36. As the piston and tubular valve are together moved under air pressure in the cylinder 26, the discharge valve 43 remains stationary while its seat 41 is moved with relation to the valve to provide an opening as indicated in Fig. 5 for the grease to pass through from the pump or injector to the cylinder head 47 and lubricating pipe 32.

In Fig. 3, the lubricating pipe 32 is shown with a coupling 49 which is provided with a machined fit or joint for the pipe 32 and is threaded to an elbow 50. The elbow is connected by nipple 51 to the bearing head 52, and a spring pressed check valve 53 of sufficient power is provided to retain the grease in the pipe 32 and prevent reverse movement of the grease that is supplied to the bearing through the head 52.

In Fig. 5, the valve has closed its grease ports 28, and injector piston 36 has ejected a contained charge of grease through perforated washer 39, extension 30, open valve seat 41, washer 42 and the perforated abutment 46, to the lubricating pipe 32. When the air pressure on valve 29 and injector piston 36 is released, the contracted springs 31 and 38 automatically return the valve and piston to normal position and the interior of the valve and piston are recharged with a supply of grease through the groove 27 and ports 28. The tubular valve returns to normal position and releases valve 43 to its seat 41.

The bearings to be lubricated are provided with standard types of oil or grease cups of which parts are shown in Fig. 3. The grease pipes 32 may have soldered joints or machined joints, as required, for rendering the lubricating system air tight and liquid tight, and the necessary flexibility is provided for in the grease pipes 32 and their connections to prevent breaking of the connections, and compensate for movement between the sprung and unsprung parts of the automotive vehicle.

The joints of the tubular connections or piping between the air reservoir 4, grease tank 6, and control means indicated at 11 in Fig. 1, may be sealed with hard solder to prevent leakage, while joints in other parts of the service pipes may be machined. When the chassis of an automobile is to be lubricated to prevent any loss of air pressure through these machined joints, or other joints, a hydraulic expansion chamber 12' may be provided and filled with a light oil. This chamber has a capacity equal to the displacement of the piston ejectors in the pump cylinders, and is located between the control mechanism and the distributing points of the lubricating system so that hydraulic and pneumatic pressure may be transmitted to the grease for lubricating the bearings. To test and close air leaks in the lubricating system with the service air lines and chamber 12' filled with the light oil, air pressure is turned on and the pressure forces oil out of any leaky joints, thus disclosing the leaky connection in order that the defect may be remedied.

Thus as the movement and vibration of an automobile tends to loosen all mechanical joints or said joints in the lubricating system and thus decrease its efficiency, the test may be applied as described to ascertain the condition of the joints and to remedy any defects therein. To compensate for vibrations between parts of the chassis which carries the lubricating system, flexible tubing or piping is used.

The operation of the grease pumps may be accomplished either manually from the instrument board 3 of the automobile, or automatically from an operating part of the automobile. A duplex valve mechanism is provided at 11 which controls admission of air under pressure from the reservoir 4 to the several pumps 20, to operate them, and this mechanism 11 also releases the air from the pumps in order that the latter may be recharged after the pumps have been operated.

In Fig. 12, a rotary knob or handle 54 is fixed to the shaft 55 journaled in a sleeve 56 which is supported in the instrument board 3 of the automobile, and a pointer 57 on the rotary knob coacts with spaced legends such as Neutral, Lubricate, and Recharge on the dial plate 58, for use in manually operating the lubricating system.

The duplex valve mechanism including the operating shaft 55 is provided with a cam lug 59 adapted to alternately coact with the duplex valve devices for controlling the pneumatic operation of the pumps. These duplex valves, which are normally closed, are used one for applying pressure to and operating the pumps, and the other for releasing air pressure from the pumps to permit recharging of the pumps with grease, are supported in a cylindrical casing 60 which is integral with the bracket 61 and bearing sleeve 56. The cylinder or casing 60 is located in front of the instrument board 3 and supported therefrom. The shaft 55 projects transversely through the cylinder, and this lug or cam 59 is adapted to turn clockwise for coaction with the two opposed piston plungers 62 and 63. These plungers are normally held in contact with the shaft 55 by their springs 64, and the stems 65 on these piston plungers are adapted to operate the pneumatic valve devices 66 and 67. The device 66 is located in a nipple 68 which is located between pipe 10' extending from the reservoir 4, and this valve device 66 controls passage of compressed air from the reservoir to the pumps. The cylinder 60 is provided with an elbow 69 and nut 70 couples this elbow with air pipe 71 which latter pipe is connected to a T head 72, and this T head is connected by pipe 73 to the expansion chamber 12. The T head 72 is connected at one end of the cylinder 60, and the valve device 67 is located in the arm 74 of the T head. The piston plunger 63 is provided with a stem and head similar to the piston plunger 62, and it also is provided with a spring similar to spring 64. At 75 the cylinder is provided with an exhaust or outlet port for escape of air when pressure is released from the pumps. Thus as shown in Fig. 10, both the valve devices 66 and 67 are closed. These devices are of standard make similar to the valve "insides" used on the air valves of pneumatic wheel tires. When the pumps are to be operated, the shaft 55 is turned clockwise causing cam 59 to engage piston plunger 62. The plunger is moved to the left in Fig. 10 causing it to contact with the valve device 66 and this action permits air pressure to flow as indicated by the arrows through the left end of the cylinder and into the air pipe 71 and from said pipe through pipe 73 to the expansion chamber 12. The pumps are operated by the air pressure as heretofore described. After the pumps have been operated, it is necessary to release the air pressure in order that the pumps may be recharged with grease. When the shaft 55 is turned to release its cam 59 from the piston plunger 62, the latter is retracted by its spring 64, and the valve device 66 is closed to prevent further flow of air pressure therethrough. The cam 59 is now turned to contact with and push piston plunger 63 to the right in Fig. 10. This action opens the closed valve device 67, and the interior of the air pipes and air pumps are vented through the ports 75, as indicated by dotted arrows in Fig. 10. After venting, the cam 59 is turned to permit the piston plunger 63 to release the valve device 67. The knob 54 is now turned to the neutral position and the pumps are recharged with a supply of grease from the grease tank 6, after which the knob 54 is turned to neutral position leaving the lubricating system in condition to be again operated when necessary.

In some instances the shaft 55 is turned automatically and mechanically. For instance, a flexible shaft 76 may be geared to the speedometer of an automobile in such manner that the shaft 55 may be revolved once for every fifty miles as indicated by the speedometer. This flexible shaft 76 is provided with a worm screw 77 located in the housing 78 which is preferably integral with the cylinder 60, and the worm gear 77 engages with a worm gear 79 on a clutch shaft 80 which latter shaft is a continuation of the shaft 55 and provided with a spring pressed clutch 81, the spring being designated 82 and located within the housing 78. This construction permits the manual control of the pump operating mechanism through the use of the knob 54, whereby the clutch performs the function of a ratchet and the clutch 81 also permits the shaft 55 to be revolved from the speedometer or from any other suitable rotating accessory of the automobile, the automatic operation of the system is thus indicated by movement of the knob.

In Figs. 8 and 9, I have shown a centralized arrangement of the grease pumps 83. In these figures, the pumps 83 are clustered about the grease tank 84, and the cone shaped bottom 85 of the tank is connected by ports 86 with the several pumps 83. A circular air pipe 87 is connected with the ends of the pumps 83, and air under pressure is supplied thereto through pipe 88. Air under pressure is supplied to the tank 84 through the connection 89, and the tank may be filled with grease after removing the plug 90.

Having thus fully described my invention, what I claim as new and desire to secure by Letters Patent, is:—

1. The combination in a lubricating system for vehicle chassis bearings including a compressed air reservoir and a grease supply tank connected therewith, of a plurality of distributing supports having air and grease conduits therein located at various places on the chassis, a plurality of pneumatic injector pumps supported from said distributing supports, conduits leading from the air reservoir and grease tank to the pumps, and control means for said pumps whereby they are alternately charged and discharged to grease said bearings.

2. In a lubricating system involving a plurality of pneumatic injector pumps each comprising a cylinder having an inlet for compressed air and an outlet for grease under pressure, said cylinder having an intermediate grease inlet, a tubular slide valve within the cylinder having grease inlet ports and a grease outlet valve carried by said slide valve, and a relatively movable injector piston within the tubular valve.

GUSTAF W. HANSON.